United States Patent
Lim et al.

(10) Patent No.: US 9,661,229 B2
(45) Date of Patent: May 23, 2017

(54) METHOD FOR CAPTURING A PICTURE IN A PORTABLE TERMINAL BY OUTPUTTING A NOTIFICATION OF AN OBJECT BEING IN A CAPTURING POSITION

(75) Inventors: Chae-Kyu Lim, Gyeongsangbuk-do (KR); Hye-Jung Kim, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/368,578

(22) Filed: Feb. 8, 2012

(65) Prior Publication Data

US 2012/0200761 A1    Aug. 9, 2012

(30) Foreign Application Priority Data

Feb. 8, 2011    (KR) .......................... 10-2011-0010853

(51) Int. Cl.
*H04N 5/222*    (2006.01)
*H04N 5/232*    (2006.01)
*H04N 5/228*    (2006.01)

(52) U.S. Cl.
CPC ..... *H04N 5/23293* (2013.01); *H04N 5/23222* (2013.01)

(58) Field of Classification Search
USPC ..................... 348/222.1, 33.02–333.03, 346
See application file for complete search history.

(56) References Cited

U.S. PATENT DOCUMENTS

| | | | | |
|---|---|---|---|---|
| 7,721,207 B2* | 5/2010 | Nilsson | .......................... | 715/707 |
| 7,764,877 B2* | 7/2010 | Suzuki et al. | ................ | 396/124 |
| 7,781,710 B2* | 8/2010 | Higashino | .................. | 250/201.2 |
| 7,868,917 B2* | 1/2011 | Nakamura | ............... | 348/208.14 |
| 7,889,891 B2* | 2/2011 | Tsukiji et al. | ................. | 382/118 |
| 7,920,785 B2* | 4/2011 | Kretz et al. | .................... | 396/263 |
| 7,924,323 B2* | 4/2011 | Walker | ................. | G11B 27/034 |
| | | | | 348/231.2 |
| 8,102,461 B2* | 1/2012 | Choi | ............................ | 348/345 |
| 8,212,911 B2* | 7/2012 | Nonaka | ..................... | 348/333.04 |
| 8,243,180 B2* | 8/2012 | Sugino | ..................... | 348/333.04 |
| 8,345,145 B2* | 1/2013 | Hur | .................... | H04M 1/72544 |
| | | | | 348/345 |
| 8,416,306 B2* | 4/2013 | Yun et al. | ................ | 348/208.12 |
| 8,587,670 B2* | 11/2013 | Wood | ................. | H04N 1/00323 |
| | | | | 348/207.99 |

(Continued)

FOREIGN PATENT DOCUMENTS

| | | | |
|---|---|---|---|
| JP | 2007-142866 A | 6/2007 | |
| JP | 2008-219449 A | 9/2008 | |

(Continued)

OTHER PUBLICATIONS

Korean Search Report, dated Feb. 2, 2017.

*Primary Examiner* — Ngoc-Yen Vu
(74) *Attorney, Agent, or Firm* — Cha & Reiter, LLC

(57) ABSTRACT

A method for capturing a picture in a portable terminal is provided, in which a capturing position is set on a preview screen in a capturing mode, it is determined whether an object is inside the capturing position, then a user is notified when the object is inside and of the picture is taken when a predetermined condition is satisfied.

17 Claims, 4 Drawing Sheets

(56) References Cited

U.S. PATENT DOCUMENTS

| | | | |
|---|---|---|---|
| 2006/0044399 A1* | 3/2006 | Fredlund | H04N 5/23293 348/207.99 |
| 2007/0115363 A1 | 5/2007 | Nakamura | |
| 2008/0218596 A1* | 9/2008 | Hoshino | 348/222.1 |
| 2009/0066803 A1* | 3/2009 | Miyata | 348/222.1 |
| 2009/0322897 A1 | 12/2009 | Park | |
| 2010/0199232 A1* | 8/2010 | Mistry et al. | 715/863 |
| 2010/0225773 A1* | 9/2010 | Lee | 348/222.1 |
| 2011/0018795 A1* | 1/2011 | Jang | G06F 3/0304 345/156 |
| 2011/0107216 A1* | 5/2011 | Bi | G06F 3/011 715/716 |
| 2011/0216209 A1* | 9/2011 | Fredlund et al. | 348/211.99 |
| 2011/0317031 A1* | 12/2011 | Honda | 348/229.1 |

FOREIGN PATENT DOCUMENTS

| | | |
|---|---|---|
| KR | 10-2009-0011854 A | 2/2009 |
| KR | 10-2009-0078121 A | 7/2009 |

\* cited by examiner

US 9,661,229 B2

METHOD FOR CAPTURING A PICTURE IN A PORTABLE TERMINAL BY OUTPUTTING A NOTIFICATION OF AN OBJECT BEING IN A CAPTURING POSITION

CLAIM OF PRIORITY

This application claims priority under 35 U.S.C. §119(a) to a Korean Patent Application filed in the Korean Intellectual Property Office on Feb. 8, 2011 and assigned Serial No. 10-2011-0010853, the contents of which are incorporated herein by reference.

BACKGROUND OF THE INVENTION

1. Field of the Invention

The present invention relates to a portable terminal, and more particularly, to a method for capturing a picture in a portable terminal.

2. Description of the Related Art

In general, a portable terminal refers to an electronic device capable of enabling voice and data communication as well as video conferencing while roaming.

The portable terminals are also used in a variety of fields, beyond voice calls. For example, a portable terminal can now reproduces multimedia stored from an external server, or downloads applications therefrom. Further, the portable terminal is readily equipped with a high-performance camera function for capturing a picture (e.g. a still image or a video) and sharing the captured picture. When capturing a self-portrait, a user is unable to accurately set a composition or an angle of view that is ideal for self-portrait.

Accordingly, there exists a need for a method for readily checking the position of an object during a capturing mode including a self-portrait mode according to a user's desired setting.

SUMMARY OF THE INVENTION

An aspect of embodiments of the present invention is to address at least the problems and/or disadvantages and to provide at least the advantages described below. Accordingly, an aspect of embodiments of the present invention is to provide a method for readily setting and checking the position of an object in a picture to be taken and thus rapidly providing a satisfactory capturing experience for a user of a portable terminal.

In accordance with an embodiment of the present invention, there is provided a method for capturing a picture in a portable terminal, in which a capturing position is set on a preview screen in a capturing mode, it is determined whether an object is at the desired capturing position. A user is notified that the object is at the capturing position when the object is within the desired capturing position, and then a picture of the object is taken according to a predetermined condition.

In accordance with an embodiment of the present invention, a method for capturing a picture in a portable terminal includes: setting a capturing position on a preview screen during a capturing mode; determining whether an object is inside the capturing position and notifying when the object is inside at the capturing position; and capturing a picture of the object according to a predetermined condition.

In accordance with an embodiment of the present invention, a method for capturing a desired image in a portable terminal includes: selecting a capturing position on a preview screen during a capturing mode; determining whether the image is inside the capturing position; comparing the image with a pre-registered image when the image is inside the capturing position to determine whether the comparison satisfies a predetermined condition; and capturing the image when the predetermined condition is satisfied.

In accordance with an embodiment of the present invention, a portable terminal for capturing a desired image includes a memory and a controller configured to: select a capturing position on a preview screen during a capturing mode; determine whether the image is inside the capturing position; compare the image with a pre-registered image when the image is inside the capturing position to determine whether the comparison satisfies a predetermined condition; and capture the image when the predetermined condition is satisfied.

BRIEF DESCRIPTION OF THE DRAWINGS

The above features and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE INVENTION

Reference will now be made in detail to the preferred embodiments of the present invention with reference to the accompanying drawings. The following description is given only of components and/or operations required to understand the present invention and the other background art will not be described lest it should make the subject matter of the present invention obscure.

A portable terminal according to an embodiment of the present invention is a mobile electronic device. The term "portable terminal" used herein covers a broad range of terminals such as a video phone, a mobile phone, a smart phone, an International Mobile Telecommunications (IMT)-2000 terminal, a Wideband Code Division Multiple Access (WCDMA) terminal, a Universal Mobile Telecommunication System (UMTS) terminal, a Personal Digital Assistant (PDA), a Portable Multimedia Player (PMP), a Digital Multimedia Broadcasting (DMB) terminal, a laptop computer, a tablet, etc.

Figure 1:
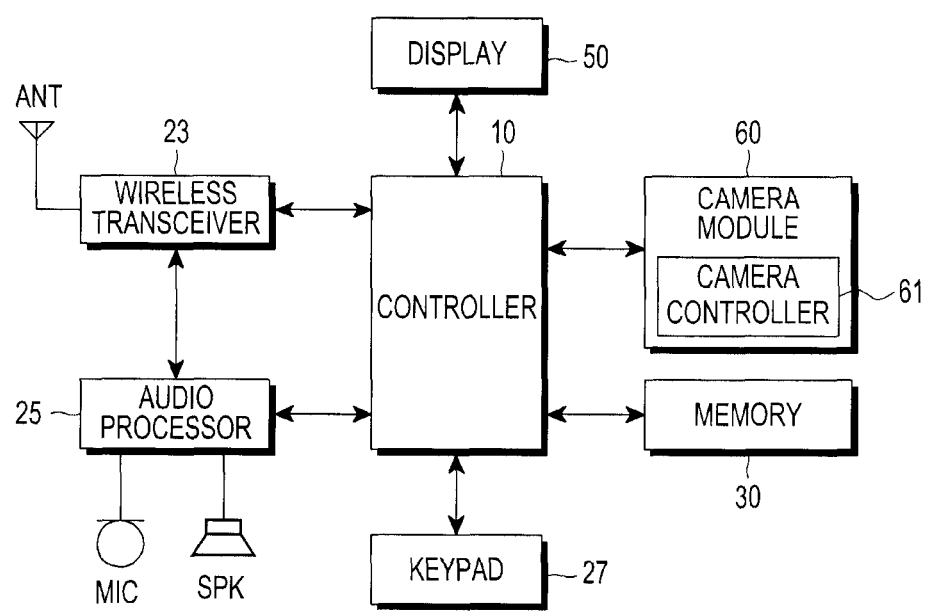
FIG. 1 is a block diagram of a portable terminal according to an embodiment of the present invention.

FIG. 1 is a block diagram of a portable terminal according to an embodiment of the present invention.

While the portable terminal is shown in FIG. 1 as not having components such as a Global Positioning System (GPS) module, a Bluetooth module, a Wireless Fidelity (Wi-Fi) module, an acceleration sensor, a proximity sensor, a geomagnetic sensor, and a DMB receiver, it is clearly understood to those skilled in the art that they may be included in the portable terminal and provide their own functions.

For instance, the acceleration sensor senses the movement state of the portable terminal by measuring dynamic force such as acceleration, vibration, impact, etc. The display direction of a display of the portable terminal may be detected based on the sensed movement state of the portable terminal. The proximity sensor senses approach of a user's body part toward the portable terminal. The sensed information of the proximity sensor may be used to prevent malfunction of the portable terminal, if the portable terminal provides a touch screen function. A gyroscope monitors dynamic rotation of the portable terminal. It may be used in conjunction with the acceleration sensor in order to sense rotational motion of the portable terminal along six axes, specifically up and down, back and forth, side by side, and x-, y- and z-axis rotations.

Referring to FIG. 1, a wireless transceiver 23 includes a Radio Frequency (RF) unit and a MODEM. The RF unit includes an RF transmitter for upconverting the frequency of a transmission signal and amplifying the upconverted signal and an RF receiver for low-noise-amplifying a received signal and downconverting the frequency of the low-noise-amplified signal. The MODEM includes a transmitter for encoding and modulating the transmission signal and a receiver for demodulating and decoding the signal received from the RF unit.

An audio processor 25 may include a Coder-Decoder (CODEC). The CODEC includes a data CODEC and an audio CODEC. The data CODEC processes packet data and the audio CODEC processes an audio signal such as voice and a multimedia file. The audio processor 25 reproduces an audio signal by converting a digital audio signal received from the MODEM to an analog signal through the audio CODEC, or converts an analog audio signal generated from a microphone to a digital audio signal through the audio CODEC and transmits the digital audio signal to the MODEM. The CODEC may be configured separately or incorporated into a controller 10.

A keypad 27 may include alphanumerical keys for entering digits and characters and function keys for setting functions. The keypad 27 may also include a touch sensor to receive a key input corresponding to a user's touch. If a display 50 is configured into a capacitive or resistive touch screen, the keypad 27 may be omitted or include a minimum number of keys. In this case, the display 50 may serve as an input for the related key input functions.

According to the embodiment of the present invention, the keypad 27 or the display 50 may provide a selection key by which a user can set (e.g. select) a capturing position and capturing keys related to picture capturing.

A memory 30 may include a program memory and data memories. The program memory stores programs for controlling regular operations of the portable terminal. The memory 30 may include an external memory such as a Compact Flash (CF) memory card, a Secure Digital (SD) card, a micro-SD memory card, a mini-SD memory card, an eXtreme Digital (XD) card, and a memory stick. The memory 30 may also include a disk such as a Hard Disk Driver (HDD) and a Solid State Disk (SSD).

The display 50 displays various types of information generated in the portable terminal. The display 50 may be various types of displays such as a Liquid Crystal Display (LCD), an Organic Light Emitting Diode (OLED) display (e.g. a Passive Matrix OLED (PMOLED) or Active Matrix OLED (AMOLED) display), etc. The display 50 may also be a capacitive or resistive touch screen that can be used not only as an output device but also as an input device along with the keypad 27. In the embodiment of the present invention, when a capturing mode is set, the display 50 may display an image received through a camera module 60 on a preview screen.

The camera module 60 converts an optical signal received (or captured) through a lens to an electrical image signal. The user can capture a picture (a still image or a video) using the camera module 60. The camera module 60 includes a lens unit (not shown) for collecting light and transmitting the collected light to a camera sensor, the camera sensor (not shown) for converting an optical signal generated during picture capturing to an electrical image signal, a camera memory (not shown) for temporarily storing a captured picture, a flash (not shown) for providing an appropriate light intensity for picture capturing, and a camera controller 61 for providing overall control to the camera module 60 and converting an analog image signal captured through the camera sensor to digital data.

Herein, the lens unit may include one or more lenses. The camera sensor may be a Charge Coupled Device (CCD) sensor or a Complementary Metal Oxide Semiconductor (CMOS) sensor. The camera controller 61 may be configured with an Image Signal Processor (ISP) or a Digital Signal Processor (DSP). The camera sensor and the camera controller 61 may be configured separately or incorporated into a single unit.

The flash is a camera part for using, as a light source, discharged light generated instantaneously when high-voltage DC flows through a Xenon discharge tube. Generally, a flash is called a product name, strobe, an electronic flash, or a speed flash. A layered battery is typically used as a power supply for the flash in order to increase a given voltage to a high voltage. Flash types include a clip-on type with Guide Number (GN) 14 to 30 and a clip type with GN 30 to 50. The flash emits light for a very short time, about 1/1,000 second, very bright like white light (natural light). Thus, the flash serves as a significant light source of artificial light.

The camera controller 61 controls the camera module 60 to output an image captured by (or received from) the lens unit and the camera sensor. Specifically, the camera controller 61 includes a CODEC for capturing a picture according to settings (e.g. a resolution, an aperture, a shutter speed, a color temperature, etc.) and compressing the captured picture into a still image format such as Joint Photographic Coding Experts Group (JPEG) or a video format such as Moving Picture Experts Group (MPEG), suitable for processing in the controller 10 of the portable terminal. The camera controller 61 may control the CODEC to output the compressed picture in the JPEG or MEPG format to the controller 10 of the portable terminal.

The camera controller 61 may control the camera module 60 to output a picture to be taken (or to be received) through the lens unit and the camera sensor as a preview screen (or a preview image) to the controller 10. For example, the camera controller 61 converts an image signal captured through the camera sensor, etc. to digital data, converts the digital data to a YUV format suitable for display of a preview screen, and outputs the digital data of the YUV format to the controller 10. Then the controller 10 receives the digital data of the YUV format and displays it on the display 50. YUV is a pixel representation scheme using a luminance component Y and chrominance components U and V. Compared to a typical Red, Green, Blue (RGB)

format, the YUV format enables transmission in a narrow bandwidth and thus is suitable for displaying a screen such as a preview screen.

The controller 10 provides overall control to the portable terminal. The controller 10 may switch one operation of the portable terminal to another operation according to a user input received through the keypad 27 or the display 50 and control the operations of the portable terminal. In accordance with the embodiment of the present invention, the controller 10 determines whether a specific object is disposed at a predetermined capturing position. If the specific object is disposed at a predetermined capturing position, the controller 10 notifies the user that the specific object is in position. Then, if a predetermined condition is satisfied, the controller 10 controls a picture to be taken.

Figure 2:
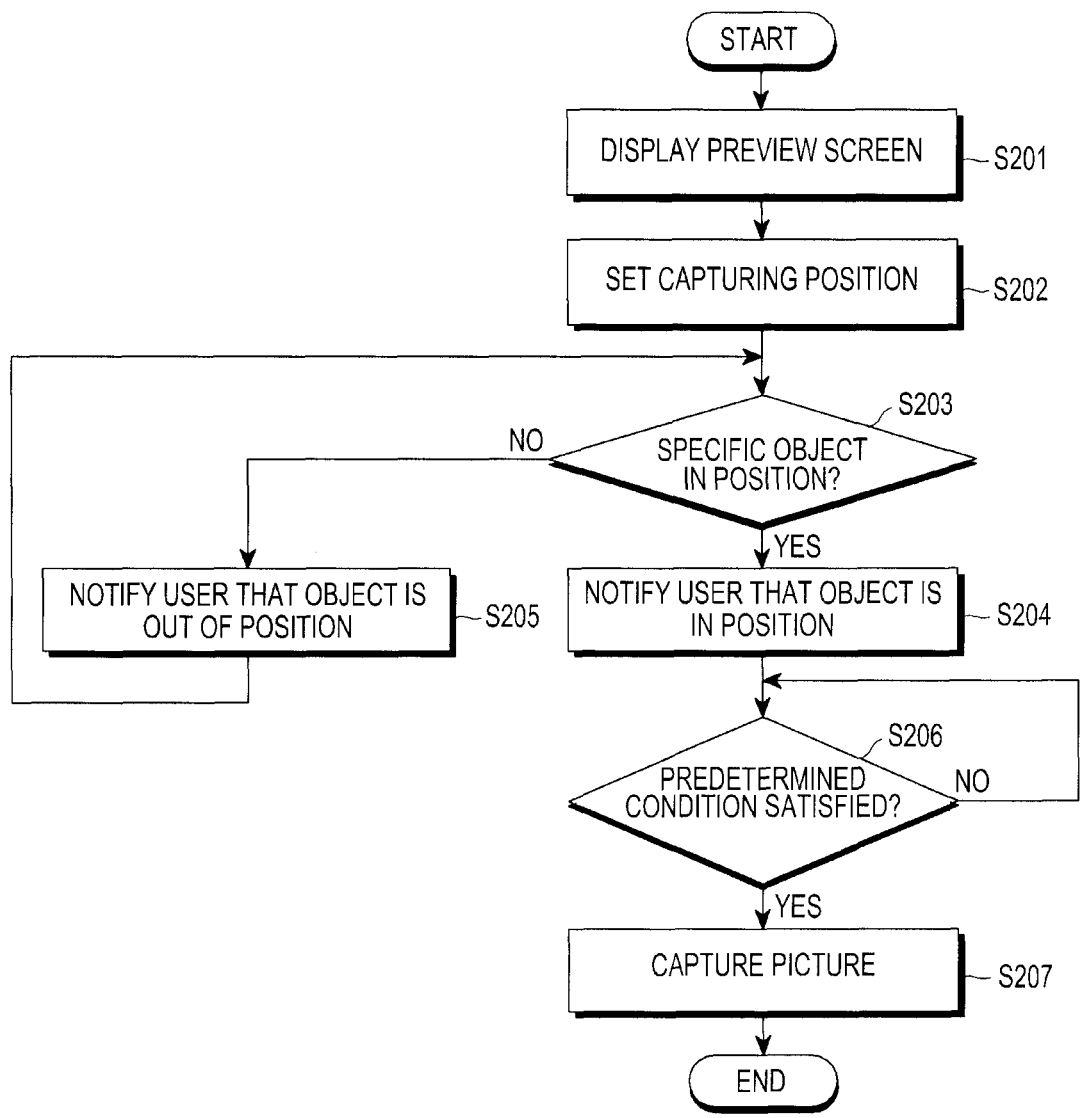
FIG. 2 is a flowchart illustrating a method for capturing a picture according to an embodiment of the present invention.
Figure 3:
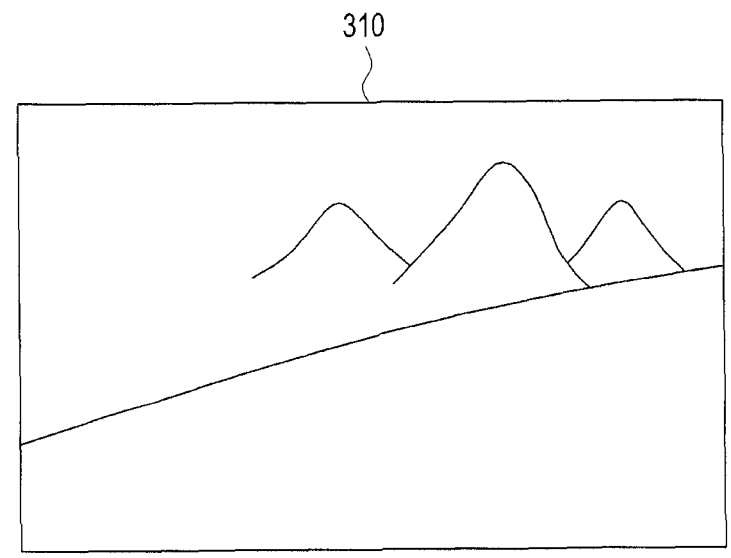
FIG. 3 illustrates an example of an operation for capturing a picture according to the embodiment of the present invention.
Figure 3:
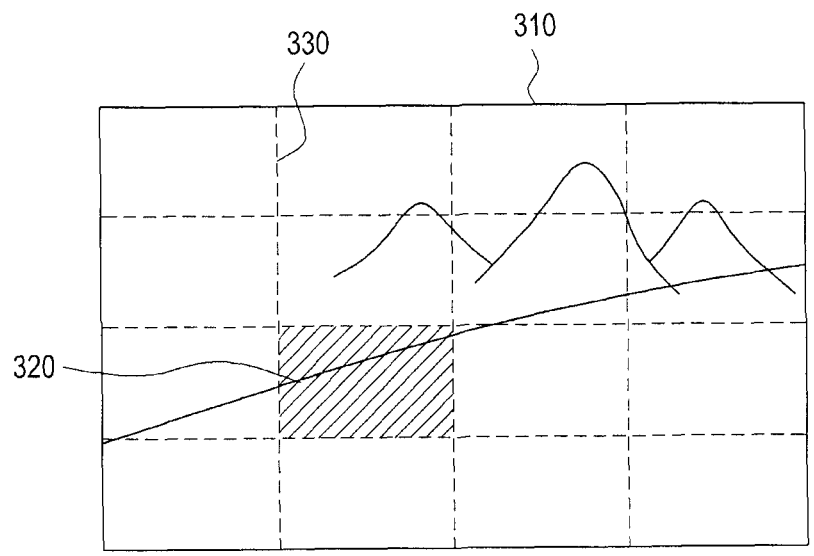
Figure 4:
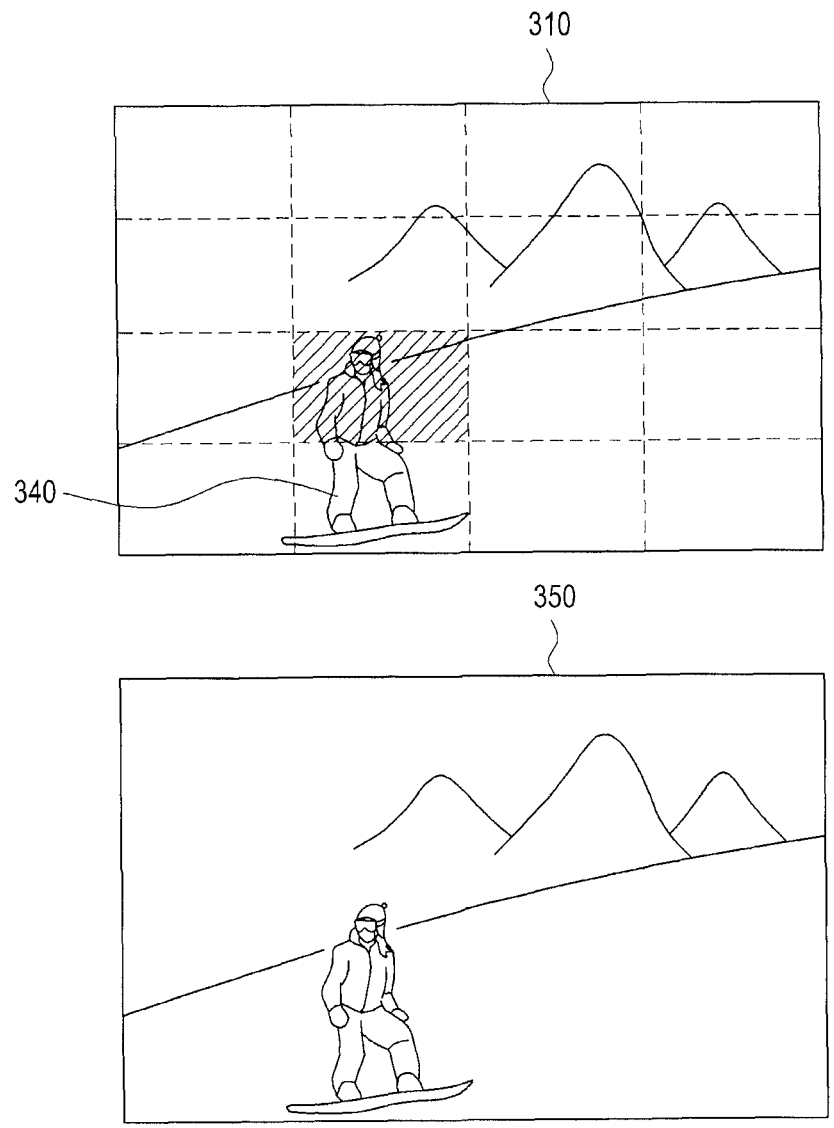
FIG. 4 illustrates another example of the operation for capturing a picture according to the embodiment of the present invention.

FIG. 2 is a flowchart illustrating a method for capturing a picture according to an embodiment of the present invention and FIGS. 3 and 4 illustrate examples of an operation for capturing a picture according to the embodiment of the present invention.

Referring to FIG. 2, when the user requests a capturing mode, a preview screen is displayed in step S201, and the user sets a capturing position on the preview screen in step S202. The capturing position represents a portion of display area where the user wishes to capture a desired image.

Specifically, the user may request the capturing mode by selecting (e.g. executing) an icon representing a specific menu associated with picture capturing or an icon representing a specific application associated with picture capturing, in order to take a picture.

As the capturing mode is set, the user may request display of a preview screen 310 including an image on the display 50, as illustrated in FIG. 3. The image displayed in the preview screen 310 may be updated through user manipulation of the portable terminal, for example, by moving the portable terminal with respect to the camera module to place the desired object at a specific location of the screen.

After setting the composition of a picture by manipulating the portable terminal, while monitoring the image displayed in the preview screen 310, the user selects a specific position in the preview screen 310 and selects (e.g. sets) it as a capturing position.

According to the present invention, a capturing position is selected (or set) so as to facilitate a picture to be readily taken when a specific object is within or inside the capturing position, which will be described later in detail.

Meanwhile, to allow the user to easily set (or select) the capturing position, the preview screen may be provided as a grid with a plurality of screen segments, for example, a grid screen 330. Thus, the user may select the capturing position by selecting at least one of the screen segments. As the grid screen is divided into more screen segments, the capturing position may be more accurate. Accordingly, the degree to which the grid screen is divided (e.g. the number of screen segments in the grid screen) may vary in alternative embodiments of the present invention. Further, the shape of grid may be other shapes than shown in FIG. 3.

In steps S203, S204 and S205, the controller 10 determines whether the specific object is within or inside the capturing position and notifies the user whether the specific object is inside the captured position.

After setting the capturing position in steps S201 and S202, the user may move to the capturing position if the user is the specific object, or the user may include a specific object (e.g. a friend) in the preview screen by manipulating the portable terminal, for example, by pointing the camera lens at the specific object.

If the specific object (e.g. the user or the friend) is at the capturing position (e.g. the capturing position set in step S202) in the preview screen, the controller 10 determines whether the specific object matches a pre-registered picture by comparing them. For example, the controller 10 may determine whether the match rate between the specific object and the pre-registered picture is, for example, a predetermined value (e.g. 70%) or above by comparing them using a facial recognition function. It should be noted that the facial recognition function is well known to those skilled in the art, thus a variety of techniques known to artisians can be implemented.

The pre-registered picture is preferably a captured image including a person's face (e.g. the user's or the friend's face). The controller 10 determines whether the match rate (or similarity rate) between the pixel data of the pre-registered picture and the pixel data of a facial part of the specific object located at the capturing position is a predetermined value or above (e.g. 70% or above) by comparing them.

That is, the controller 10 determines whether a person (e.g. the object) matching the pre-registered picture is located within or inside the capturing position. Then the controller 10 notifies the user whether or not the identical person is in position by audible, visual, and tactile notification.

In accordance with the embodiment of the present invention, the controller 10 may notify the user whether or not the identical person is in position by combining audible signal, visual light, and tactile alerts in such a manner that the occurrence of a match or a mismatch can be differentiated to the user. The audible information may be sound data that is output through a speaker (SPK), the visual information may be information output through an illuminator such as a Light Emitting Diode (LED) or the display 50, and the tactile information may be vibration of the portable terminal. The pre-registered picture may be an image registered in directory information such as a phonebook. In addition, the pre-registered picture may be an image captured previously or stored before or after the capturing mode is set.

Referring to FIG. 4, for example, the user may select a specific image registered in directory information and may request picture capturing, referring to the selected image. In the capturing mode, the controller 10 may determine whether the match rate between the user-selected image and an object 340 at a capturing position 320 set in a preview screen is equal to or larger than a predetermined value. That is, the controller 10 determines whether the object 340 at the capturing position 320 is identical to a person in the selected image.

In another example, the user may capture the user's or friend's face before or after the capturing mode is set and may request picture capturing based on the captured image of the user's or friend's face (e.g. a pre-captured image). Then, the controller 10 may determine whether the match rate between the pre-captured image (e.g. the facial part of the image) and the object 340 at the capturing position is equal to or larger than a predetermined value.

In steps S206 and S207, the controller 10 controls a picture to be taken, if a predetermined condition is satisfied.

Specifically, if the predetermined condition is satisfied, the controller 10 controls the camera controller 61 to take a picture of the object (e.g. the user or the friend).

That is, a picture is or is not taken according to whether the predetermined condition is satisfied. The predetermined condition may be that a predetermined time has been elapsed after the match confirmation, a key input corresponding to a capture request has been received, or a gesture input corresponding to a capture request has been received.

Regarding the time elapse condition, when the pre-registered image matches the object by a predetermined value or above in step S203, the controller 10 may control a picture to be automatically captured within a predetermined time.

Regarding the key input condition, after being notified that the object (e.g. the user or the friend) is in position, the user may request picture capturing by inputting a key corresponding to picture capturing. For example, the user may input a key on the keypad 27 or the display 50, or may input a key using a remote control such as Wireless Release.

Regarding the gesture input condition, after being notified that the object is in position, the user may request picture capturing by making a predetermined motion such as a gesture.

Referring to FIG. 4, for example, if the object 340 located at the capturing position 320 is the user during a self portrait mode, the user is notified that the user is inside the capturing position 320. Then, the user may request picture capturing by making a predetermined gesture such as waving the user's hand. Upon receipt of the user's gesture input, the controller 10 senses the motion of the user 340 in the image displayed on the preview screen, herein hand waving, determines that the motion indicate a capturing start command, and then controls the camera controller 61 to take a picture of the user.

While a picture may be taken shortly after the predetermined motion is sensed in the embodiment of the present invention, it may be further contemplated as another embodiment of the present invention that a picture is taken a predetermined time period lapses (e.g. 2 seconds) after the motion sensing so that the user can pose for the self portrait picture. The embodiment of capturing a picture by sensing a predetermined gesture of a user is preferable when the portable terminal is apart from the user (e.g. the object) by a long distance.

When the predetermined condition is satisfied and thus a picture is taken in steps S206 and S207, such a picture 350 as illustrated in FIG. 4 can be captured.

As is apparent from the above description of the present invention, since a user can readily set and check when a desired image is within a capturing position in a portable terminal, the user (e.g. a picture taker) can capture a satisfactory picture rapidly during a capturing mode according his or her preference.

The above-described methods according to the present invention can be implemented in hardware, firmware or as software or computer code that can be stored in a recording medium such as a CD ROM, an RAM, a floppy disk, a hard disk, or a magneto-optical disk or downloaded over a network and stored on a non-transitory machine readable medium, so that the methods described herein can be rendered in such software using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A method in a portable terminal, comprising:
  receiving, by the portable terminal, a user input to activate a camera function via a touch screen display;
  displaying, by the portable terminal, a preview image on the touch screen display in response to the user input;
  receiving, by the portable terminal, an input to set a position in the displayed preview image as a capturing position, the capturing position specifying an area in the preview image where at least a portion of a user is expected to be captured;
  detecting, by the portable terminal, whether the at least the portion of the user is positioned in the capturing position; and
  in response to detecting a non-contact hand gesture executed by the user while the portion of the user is positioned in the capturing position, capturing the image.

2. The method of claim 1, wherein the portable terminal includes a wireless transceiver and an audio processor, the wireless transceiver including a radio frequency unit and a modem, the method further comprising:
  reproducing, by the audio processor, a first audio signal by converting a first digital audio signal received from the modem to a first analog signal,
  converting, by the audio processor, a second analog audio signal generated by a microphone to a second digital audio signal; and
  feeding the second digital audio signal to the modem.

3. The method of claim 1, wherein the displaying the preview image and the capturing the image is performed in a self-portrait mode.

4. The method of claim 1, further comprising:
  detecting, by the portable terminal, the non-contact hand gesture of the user from the preview image displayed on the touch screen display; and
  initiating a count-down of a predetermined time period for the user to pose in response to the detected non-contact gesture,
  wherein capturing the image is performed when the predetermined time period expires.

5. The method of claim 4, further comprising outputting at least one of an audible notification, a visual notification, and a tactile notification in response to the non-contact hand gesture taking place in the capturing position.

6. The method of claim 4, further comprising displaying an indication of the capturing position in the preview image.

7. The method of claim 6, wherein the indication of the capturing position includes a rectangle.

8. The method of claim 4, wherein the detecting includes detecting a hand motion.

9. A portable terminal, comprising:
  a touch screen display configured to receive a user input to activate a camera function; and
  a controller configured to:
    display a preview image on the touch screen display in response to the user input,
    receive an input to set a position in the displayed preview image as a capturing position, the capturing position specifying an area in the preview image where at least a portion of a user is expected to be captured, detect whether the at least the portion of the user is positioned in the capturing position, and in response to detecting a non-contact hand gesture executed by the user while the at least the portion of the user is positioned in the capturing position, capture the image.

10. The portable terminal of claim 9, wherein the controller is further configured to:

detect the non-contact hand gesture of the user from the preview image displayed on the touch screen display; and initiate a count-down of a predetermined time period for the user to pose in response to the detected non-contact hand gesture, wherein the controller captures the image when the predetermined time period expires.

11. The portable terminal of claim 10, wherein the controller is further configured to display an indication of the capturing position in the preview image.

12. The portable terminal of claim 11, wherein the indication of the capturing position includes a rectangle.

13. The portable terminal of claim 10, further comprising a wireless transceiver and an audio processor, the wireless transceiver including a radio frequency unit and a modem.

14. The portable terminal of claim 13, wherein the audio processor is configured to:

reproduce a first audio signal by converting a first digital audio signal received from the modem to a first analog signal;

convert a second analog audio signal generated from a microphone to a second digital audio signal; and feed the second digital audio signal to the modem.

15. The portable terminal of claim 10, wherein the controller is further configured to output at least one of an audible notification, a visual notification, and a tactile notification in response to the non-contact hand gesture detected in the capturing position.

16. the portable terminal of claim 10, wherein the non-contact hand gesture includes a hand motion.

17. The portable terminal of claim 9, wherein the controller displays the preview image and captures the image in a self-portrait mode.

* * * * *